United States Patent
Sugawara

(10) Patent No.: US 10,125,051 B2
(45) Date of Patent: Nov. 13, 2018

(54) CORDIERITE-BASED SINTERED BODY

(71) Applicant: KROSAKIHARIMA CORPORATION, Fukuoka (JP)

(72) Inventor: Jun Sugawara, Fukuoka (JP)

(73) Assignee: KROSAKIHARIMA CORPORATION, Fukuoka (JP)

(*) Notice: Subject to any disclaimer, the term of this patent is extended or adjusted under 35 U.S.C. 154(b) by 0 days.

(21) Appl. No.: 15/566,818

(22) PCT Filed: Apr. 1, 2016

(86) PCT No.: PCT/JP2016/060890
§ 371 (c)(1),
(2) Date: Oct. 16, 2017

(87) PCT Pub. No.: WO2016/170953
PCT Pub. Date: Oct. 27, 2016

(65) Prior Publication Data
US 2018/0118625 A1    May 3, 2018

(30) Foreign Application Priority Data

Apr. 21, 2015 (JP) ................. 2015-086985

(51) Int. Cl.
*C04B 35/195* (2006.01)
(52) U.S. Cl.
CPC .... *C04B 35/195* (2013.01); *C04B 2235/3222* (2013.01); *C04B 2235/3481* (2013.01); *C04B 2235/80* (2013.01); *C04B 2235/9607* (2013.01)
(58) Field of Classification Search
CPC .................................................. C04B 35/195
See application file for complete search history.

(56) References Cited

U.S. PATENT DOCUMENTS 8,242,039 B2    8/2012 Sugawara
8,889,576 B2 *  11/2014 Holand ............... A61K 6/0008
                                                501/103
(Continued)

FOREIGN PATENT DOCUMENTS

JP        57-38371 A     3/1982
JP     2004196589 A     7/2004
(Continued)

OTHER PUBLICATIONS

International Preliminary Report on Patentability dated Oct. 24, 2017 for PCT/2016/060890, filed Apr. 1, 2016 (English translation).
(Continued)

*Primary Examiner* — Karl E Group
(74) *Attorney, Agent, or Firm* — Paul D. Bianco; Fleit Gibbons Gutman Bongini & Bianco, PL

(57) ABSTRACT

A cordierite-based sintered body comprises cordierite as a primary crystal phase and $LaMgAl_{11}O_{19}$ as a secondary crystal phase, wherein a ratio $I_{LMA}$ (114)/$I_{MAS}$ (004) is in the range of 0.01 to 0.8, where the $I_{LMA}$ (114) denotes a peak intensity of a (114) plane of $LaMgAl_{11}O_{19}$ as measured by powder X-ray diffractometry, and the $I_{MAS}$ (004) denotes a peak intensity of a (004) plane of cordierite as measured by powder X-ray diffractometry. The disclosure is intended to enhance mechanical property and improve complex and fine processability for a cordierite-based sintered body without compromising low thermal expansibility, high dimensional long-term stability, high stiffness (high elastic modulus) and precision polishing characteristic.

9 Claims, 2 Drawing Sheets

(56) References Cited

U.S. PATENT DOCUMENTS

| | | | |
|---|---|---|---|
| 9,403,721 B2* | 8/2016 | Holand | A61K 6/0008 |
| 9,988,309 B2* | 6/2018 | Hill | C04B 35/44 |
| 2011/0254181 A1* | 10/2011 | Holand | A61K 6/0008 264/6 |
| 2012/0100982 A1 | 4/2012 | Sugawara | |
| 2015/0035210 A1* | 2/2015 | Holand | A61K 6/0008 264/681 |
| 2015/0259251 A1* | 9/2015 | Hill | C04B 35/44 252/62 |

FOREIGN PATENT DOCUMENTS

| | | | |
|---|---|---|---|
| JP | 2009107902 A | * | 5/2009 |
| JP | 2012-087026 A | | 5/2012 |

OTHER PUBLICATIONS

Written Opinion dated Jun. 14, 2016 for PCT/2016/060890, filed Apr. 1, 2016.
International Search Report dated Jun. 6, 2016 for PCT/2016/060890, filed Apr. 1, 2016 (English translation).
Written Opinion dated Oct. 27, 2016 for PCT/2016/060890, filed Apr. 1, 2016.
Jiang, Mechanical and thermal properties of LaMgAl11019, Materials Research Bulletin, Jun. 17, 2010, vol. 45, Issue 10, p. 1506-1508.

* cited by examiner

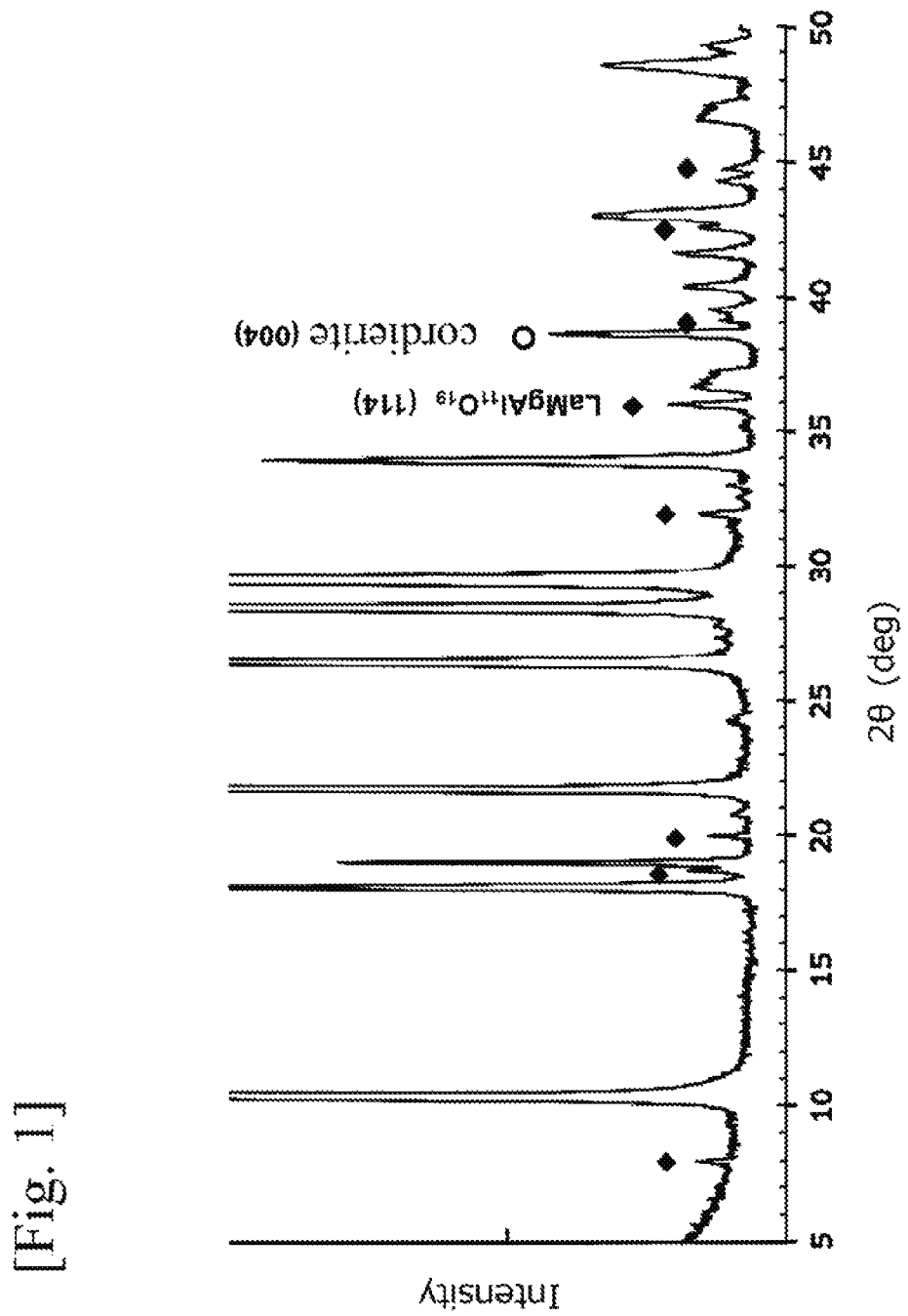
[Fig. 1]

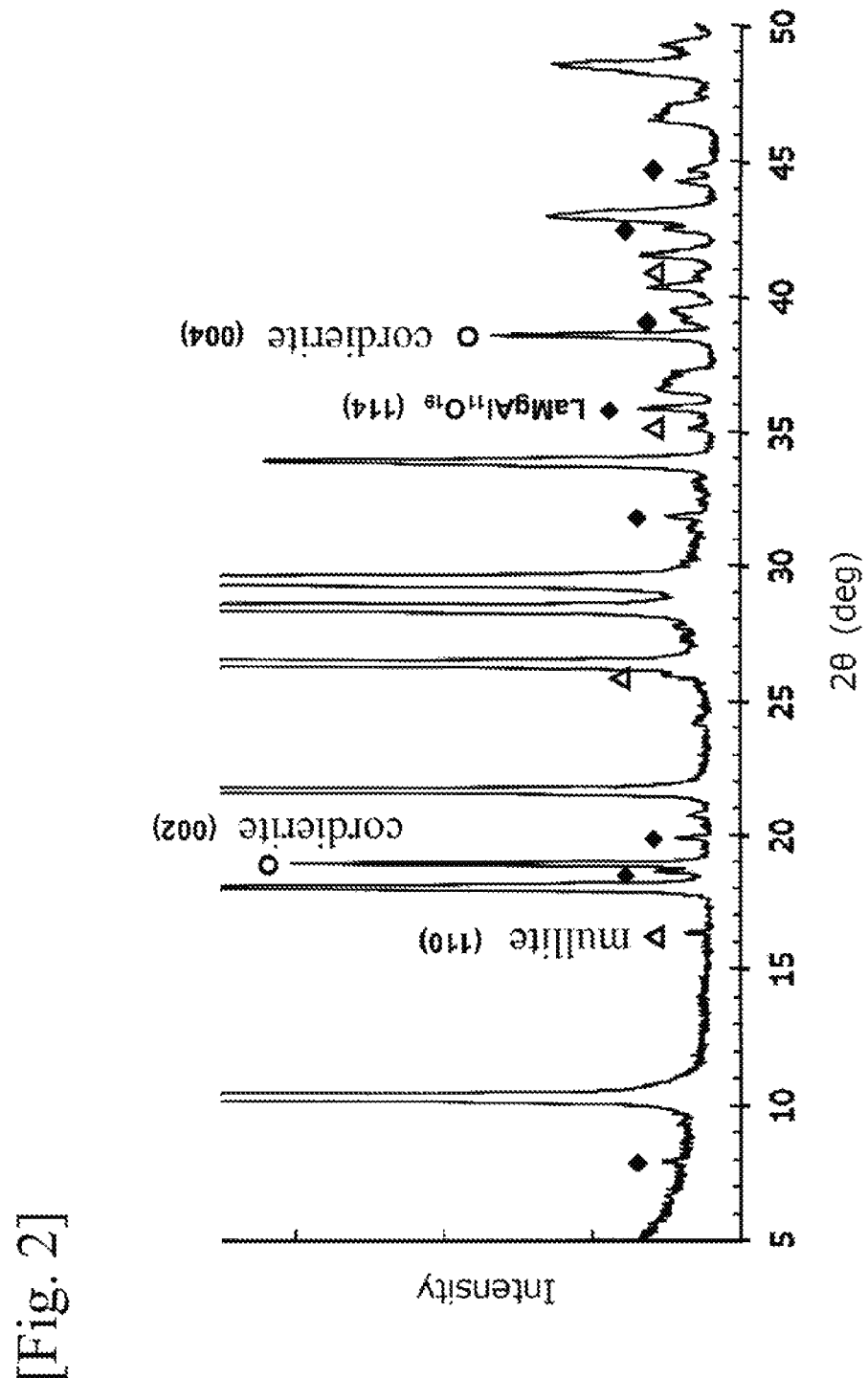

CORDIERITE-BASED SINTERED BODY

TECHNICAL FIELD

The present invention relates to a cordierite-based sintered body suitably usable as a substrate for a satellite mirror, a substrate for an aspherical mirror of telescope, a substrate for a precision mirror, a substrate for a power laser mirror, a substrate for a reference scale, a table component for a precision measuring instrument, a table component for a precision exposure machine, a reference component associated with a precision measurement and the like.

BACKGROUND ART

In connection with the progress toward higher accuracy in satellites and telescopes, higher integration in semiconductor devices, higher precision in aspherical lenses, etc., there is a growing need for components used in space and astronomical devices, manufacturing apparatuses and measuring apparatuses for the semiconductor devices to ensure high shape (dimensional) accuracy and high long-term stability of shape accuracy. Moreover, the components for the devices and the apparatuses has become very complicated and fine in a shape in recent years. As a result, fine grinding is also being increasingly required.

Meanwhile, the above ultra-precision apparatuses require a mirror for positioning or a reference mirror for reflection of laser or extreme ultraviolet rays, an aspherical mirror for light focus and the like. Therefore, the above precision mirrors are being increasingly required to have a significantly smooth surface (a surface having small surface roughness). Moreover, as a material for the mirrors, high quality materials from which super smooth surfaces can be obtained have been required. As a high-quality material from which the super smooth surface can be obtained, the material disclosed in the following Patent Document 1 is known.

Specifically, the Patent Document 1 discloses "a cordierite-based sintered body which comprises cordierite as primary components, and the cordierite-based sintered body contains one or more selected from the group consisting of La, Ce, Sm, Gd, Dy, Er, Yb and Y in an amount of 1 to 8 mass % in terms of oxide, without any crystal phase other than a cordierite crystal phase, wherein a mass ratio between respective ones of the primary components satisfies the following relations: $3.85 \leq SiO_2/MgO \leq 4.60$, and $2.50 \leq Al_2O_3/MgO \leq 2.70$, and the cordierite-based sintered body after being subjected to precision polishing has a precisely polished surface with an average surface roughness (Ra) of 1 nm or less," The invention described in the Patent Document 1 makes it possible to drastically improve a precision polishing characteristic of a cordierite-based sintered body which has low thermal expansibility, high stiffness (high elastic modulus) and high dimensional long-term stability.

However, even with the cordierite-based sintered body of the Patent Document 1, complex and fine processability does not have been to be possible to be achieved. Specifically, it has not been obtained so far any low thermal expansion material which has both of excellent precision polishing characteristic (high accuracy mirror processability) and complex and fine processability.

CITATION LIST

Patent Document

Patent Document 1: JP 2012-087026 A

SUMMARY OF INVENTION

Technical Problem

The problem to be solved by the present invention is to enhance mechanical property and improve complex and fine processability for a cordierite-based sintered body without compromising low thermal expansibility, high dimensional long-term stability, high stiffness (high elastic modulus) and excellent precision polishing characteristic.

Solution to Technical Problem

Through various researches, the inventor found that the above problem can be solved by a cordierite-based sintered body which comprises cordierite as a primary crystal phase and $LaMgAl_{11}O_{19}$ as a secondary crystal phase, and has accomplished the present invention.

Specifically, the above problem can be solved by the following invention.

(1) A cordierite-based sintered body which comprises cordierite as a primary crystal phase and $LaMgAl_{11}O_{19}$ as a secondary crystal phase, wherein a ratio $I_{LMA}$ (114)/$I_{MAS}$ (004) is in the range of 0.01 to 0.8, where the $I_{LMA}$ (114) denotes a peak intensity of a (114) plane of $LaMgAl_{11}O_{19}$ as measured by powder X-ray diffractometry, and the $I_{MAS}$ (004) denotes a peak intensity of a (004) plane of cordierite as measured by powder X-ray diffractometry.

(2) The cordierite-based sintered body as described in (1), wherein a mass ratio $Al_2O_3/MgO$ of $Al_2O_3$ to MgO in the cordierite-based sintered body is 2.7 or more, and wherein the cordierite-based sintered body contains La in an amount of 0.5 mass % to less than 3 mass % in terms oxide.

(3) The cordierite-based sintered body as described in (1) or (2), wherein an absolute value of a thermal expansion coefficient thereof is $0.05 \times 10^6/°$ C. or less, as measured at 22° C.

(4) The cordierite-based sintered body as described in any one of (1) to (3), which has a Young's modulus of 142 GPa or more, and a fracture toughness value of 1.4 MPa·m$^{1/2}$ or more as measured by the SEPB method.

Effect of Invention

A cordierite-based sintered body of the present invention contains cordierite as a primary crystal phase and $LaMgAl_{11}O_{19}$ as a secondary crystal phase, thereby enhancing mechanical property and enabling complex and fine processing. Specifically, the present invention make it possible to obtain a cordierite-based sintered body which has low thermal expansibility, high dimensional long-term stability, high stiffness (high elastic modulus) and excellent precision polishing characteristic as well as complex and fine processability.

BRIEF DESCRIPTION OF DRAWINGS

FIG. 1 presents measured intensive data of Sample NO. 1 in Table 1, which is an inventive sample, as measured by powder X-ray diffractometry using Cu—K-α line, wherein ♦ denotes X-ray diffractometry peak of $LaMgAl_{11}O_{19}$ crystal, the remaining denotes X-ray diffractometry peak of cordierite and ○ denotes a peak of a (004) plane of cordierite for comparing peak intensities.

FIG. 2 presents measured intensive data of Sample NO. 11 in Table 1, which is an inventive sample, as measured by powder X-ray diffractometry using Cu—K-α line, wherein ♦ denotes X-ray diffractometry peak of $LaMgAl_{11}O_{19}$ crystal, ▲ denotes X-ray diffractometry peak of mullite, the remaining denotes X-ray diffractometry peak of cordierite and ○ denotes peaks of (002) plane and (004) plane of cordierite for comparing peak intensities.

DESCRIPTION OF EMBODIMENTS

A cordierite-based sintered body of the present invention comprises cordierite as a primary crystal phase and $LaMgAl_{11}O_{19}$ as a secondary crystal phase. In the present invention, the term "cordierite (or cordierite crystal phase)" means a crystal phase including a pure cordierite crystal phase, and a crystal phase which has a lattice constant slightly different from the cordierite crystal due to other element incorporated therein as a solid solution, but can be specified as exhibiting a diffraction peak of a cordierite crystal as measured by X-ray diffractometry.

The cordierite-based sintered body of the present invention contains $LaMgAl_{11}O_{19}$ in such a way that a ratio $I_{LMA}$ (114)/$I_{MAS}$ (004) is in the range of 0.01 to 0.8, where the $I_{LMA}$ (114) denotes a peak intensity of a (114) plane of the $LaMgAl_{11}O_{19}$ as measured by powder X-ray diffractometry, and the $I_{MAS}$ (004) denotes a peak intensity of a (004) plane of the cordierite as measured by powder X-ray diffractometry. When the $I_{LMA}$ (114)/$I_{MAS}$ (004) is less than 0.01, the effect of enhancing mechanical property by $LaMgAl_{11}O_{19}$ cannot be obtained. On the other hand, when the $I_{LMA}$ (114)/$I_{MAS}$ (004) is greater than 0.8, characteristics such as low thermal expansibility, high dimensional longterm stability and high stiffness (high elastic modulus) effected by cordierite are compromised. In powder X-ray diffractometry using Cu—K-α line, a peak of a (114) plane of $LaMgAl_{11}O_{19}$ is observed around a diffraction angle (2θ) of 36°, and a peak of a (004) plane of cordierite is observed around 38.5°.

In the cordierite-based sintered body of the present invention, a mass ratio $Al_2O_3/MgO$ of $Al_2O_3$ to MgO, which are chemical component thereof, is preferably 2.7 or more. This is because, if the mass ratio $Al_2O_3/MgO$ is 2.7 or more, an amorphous phase in a grain boundary of the cordierite-based sintered body becomes unstable and a secondary crystal phase is like to occur, and as a result, $LaMgAl_{11}O_{18}$ is more likely to be formed.

Preferably, a content of La in the cordierite-based sintered body of the present invention is 0.5 mass % to less than 3 mass % in terms of oxide ($La_2O_3$). If the content of La is 3 mass % or more in terms of oxide and the secondary crystal phase occurs, a $LaMgAl_{11}O_{19}$ crystal phase becomes excessive. Consequently, precision polishing characteristic is undesirably likely to deteriorate. If the secondary crystal phase does not occur, the amorphous phase in the grain boundary is increased, and consequently, mechanical property such as Young's modulus is undesirably likely to deteriorate. Moreover, if the content of La is less than 0.5 mass % in terms of oxide, sinterability deteriorates, and it is undesirable unlikely to obtain a sufficiently dense sintered body.

The cordierite-based sintered body of the present invention may contain a mullite crystal phase, in addition to the cordierite crystal phase and the $LaMgAl_{11}O_{19}$ crystal phase. Specifically, even if mullite exist slightly, its influence on thermal expansion coefficient is limited, and therefore, mullite may exist as a crystal phase in the cordierite-based sintered body. However, as to the content of mullite, a ratio $I_{AS}$ (110)/$I_{MAS}$ (002) is preferably 0.2 or less, where Las (110) denotes a peak intensity of a (110) plane of mullite as measured by powder X-ray diffractometry, and $I_{MAS}$ (002) denotes a peak intensity of a (002) plane of cordierite as measured by powder X-ray diffractometry. If the ratio is greater than 0.2, a thermal expansion coefficient becomes higher, and precision polishing characteristic is likely to deteriorate. Preferably, the cordierite-based sintered body of the present invention does not contain a crystal phase other than a cordierite crystal phase, a $LaMgAl_{11}O_{19}$ crystal phase and a mullite crystal phase. In powder X-ray diffractometry using Cu—K-α line, a peak of a (110) plane of mullite is observed around the diffraction angle (2θ) of 16.4°, and a peak of a (002) plane of cordierite is observed around 19°.

Considering deformation due to a change in temperature, the cordierite-based sintered body of the present invention preferably has as low thermal expansion coefficient as possible, and more preferably has a thermal expansion coefficient of $0.05 \times 10^{-6}$/° C. or less as measured at 22° C. The cordierite-based sintered body of the present invention has significantly small thermal expansion. Thus, the thermal expansion coefficient is measured according to JIS R3251 (Measuring method of the linear thermal expansion coefficient for low expansion glass by laser interferometry).

As for mechanical property, the cordierite-based sintered body of the present invention preferably has a Young's modulus (elastic modulus) of 142 GPa or more in order to reduce deformation due to own weight or acceleration, and preferably has a fracture toughness value of 1.4 $MPa \cdot m^{1/2}$ or more in order to enable complex and fine processing (fine and precision grinding). The fracture toughness value is measured according to the single edge precracked beam method (the SEPB method) prescribed in JIS R1607.

Preferably, the cordierite-based sintered body of the present invention contains cordierite in an amount of 88 mass % or snore. If the content of cordierite is less than 88 mass %, the amorphous phase in the grain boundary of the cordierite-based sintered body is increased, and consequently, mechanical property undesirably deteriorates. Moreover, the amorphous phase in the grain boundary is crystallized to possibly produce a crystal phase other than a cordierite crystal phase and a $LaMgAl_{11}O_{19}$ crystal phase, so that a thermal expansion coefficient undesirably becomes higher.

The cordierite-based sintered body of the present invention can be produced by mixing and sintering of raw material powders (an MgO source, an $Al_2O_3$ source, a $SiO_2$ source, and a La source).

As an MgO source for raw material powder, it is possible to use a magnesia powder, a talc powder, a fused cordierite power, a synthetic cordierite power, a magnesium hydroxide powder, a magnesium carbonate powder, a magnesia spinel powder and the like. Among them, in view of sinterability of an article having a large size or a complicated shape, the fused cordierite power and the synthetic cordierite powder are most preferable as a raw material powder. As an $Al_2O_3$ source or a $SiO_2$ source, it is preferable to use a fine alumina powder, a crystalline silica powder, an amorphous silica powder and the like, in addition to the talc powder, the fused cordierite powder and the synthetic cordierite powder as described above. As a La source, it is possible to use an oxide, hydroxide or carbonate power thereof, a $LaMgAl_{11}O_{19}$, a β-lanthanum aluminate ($LaAl_{11}O_{18}$) and the like. An average particle size of each raw material powder is preferably set to a fine particle size of 0.1 to 5 μm in view of dispersibility.

An applicable sintering process may include a hot press process, an HIP process, a gas-pressure sintering process, a pressureless sintering process and the like. As a prerequisite to reducing the average surface roughness during precision polishing, pores in the sintered body must be minimized. Thus, a pressure sintering such as the hot press process, the HIP process, and the gas-pressure sintering process is effective in a final heat treatment step.

EXAMPLE 1

As for a raw material powder, a synthetic cordierite powder (average particle size: 2.6 µm), a magnesia powder (average particle size: 0.2 µm), a silica powder (average particle size: 0.7 µm) and an alumina powder (average particle size: 0.5 µm) were used as the MgO source, the $Al_2O_3$ source and the $SiO_2$ source. As the La source, a lanthanum oxide ($La_2O_3$) powder (average particle size: 1.1 µm), a β-lanthanum aluminate ($LaAl_{11}O_{18}$) powder (average particle size: 2.4 µm), and a lanthanum hydroxide ($La(OH)_3$) powder (average particle size: 1.5 µm) were used. Specifically, as for the synthetic cordierite powder, the magnesia powder, the silica powder and the alumina powder were mixed in a theoretical composition, and a reaction was induced therebetween at 1420° C. for 10 hours to form granular cordierite. Then, the obtained granular cordierite was pulverized and used. As for the β-lanthanum aluminate powder, the lanthanum oxide powder and the alumina powder were mixed in a given amount, and a reaction was induced therebetween at 1600° C. for 4 hours to synthesize granular body. Then, the obtained granular body was pulverized and used.

The above raw material powers were blended to have respective compositions as shown in Table 1. Then, a resin binder was added to each of the compositions in an amount of 3 mass parts with respect to and in addition to 100 mass parts of the composition, and they were mixed together in an alumina pot-mill for 24 hours by using water as a solvent. A resulting slurry was dried and granulated to form a shaped body under a hydrostatic pressure of 150 MPa. The obtained shaped body was sintered at 1400° C. in air, and then subjected to HIP burning at 1200° C. under an argon gas pressure of 1400 atm. In Table 1, amounts of MgO, $Al_2O_3$, $SiO_2$ and La (in terms of oxide) are shown as compositions of raw material powder. These were sintered but not vaporized, and therefore, each content in the sintered body is substantially identical to each of compositions of raw material powder.

A bulk density, a thermal expansion coefficient at 22° C., a Young's modulus (elastic modulus) and a fracture toughness value of the resulting sintered body were measured. Specifically, the bulk density was measured by a method according to JIS R1634. The thermal expansion coefficient at 22° C. was measured according to JIS R3251 (Measuring method of the linear thermal expansion coefficient for low expansion glass by laser interferometry) described above. The Young's modulus (elastic modulus) was measured by an ultrasonic pulse-echo method. The fracture toughness value was measured by the SEPB method described above. For a brittle material having a low grinding resistance such as the cordierite-based sintered body, this fracture toughness value is strongly correlated to complex and fine processability (fine and precision grindability). Specifically, the cordierite-based sintered body becomes more excellent in complex and fine processability (fine and precision grindability) as the fracture toughness value becomes higher.

To evaluate precision polishing characteristic of the resulting sintered body, an average surface roughness (Ra) of a precision polishing surface was measured. Specifically, a sample of the sintered body having a size of φ100×20 mm thickness was subjected to precision polishing, and then the average surface roughness (Ra) of the polishing surface was measured according to non-contact scanning white-light interferometry. The precision polishing comprised intermediate finishing using a slurry containing ceria particles having an average particle size of 0.5 µm, and final finishing using a slurry containing diamond particles having an average particle size of 1/10 µm.

Furthermore, the obtained sintered body was powderized, and the produced crystal phase was identified by performing powder X-ray diffractrometry using Cu—K-α line (wavelength: 1.54059 Angstrom). In addition, a ratio $I_{LMA}$ (114)/$I_{MAS}$ (004) and a ratio $I_{AS}$ (110)/$I_{MAS}$ (002) were obtained, where the $I_{LMA}$ (114) denotes a peak intensity of a (114) plane of the $LaMgAl_{11}O_{19}$, the $I_{MAS}$ (004) denotes a peak intensity of a (004) plane of the cordierite, $I_{AS}$ (110) denotes a peak intensity of a (110) plane of mullite, and $I_{MAS}$ (002) denotes a peak intensity of a (002) plane of cordierite.

As examples of measurement results of powder X-ray diffractometry, FIGS. 1 and 2 present charts of the Sample NO. 1 and the Sample NO. 11, respectively, as ones of the inventive samples, as measured by powder X-ray diffractometry using Cu—K-α line. In FIG. 1 (Sample NO. 1), a diffraction pattern of magnetoplumbite-type crystal of $LaMgAl_{11}O_{19}$ in addition to a diffraction pattern of cordierite crystal was observed. In FIG. 2 (Sample NO. 11), a diffraction pattern of mullite crystal in addition to the diffraction pattern of cordierite crystal and $LaMgAl_{11}O_{19}$ crystal was observed.

TABLE 1

| | No. | Composition of Raw Material Powder (mass %) | | | | $Al_2O_3$/MgO ratio | La Source | Crystal Phase*2 | X-ray Diffractometry Amount of LMA $I_{LMA}(114)/I_{MAS}(004)$ |
| | | MgO | $Al_2O_3$ | $SiO_2$ | La*1 | | | | |
| --- | --- | --- | --- | --- | --- | --- | --- | --- | --- |
| Inventive Sample | 1 | 12.58 | 35.70 | 49.23 | 2.50 | 2.84 | $La_2O_3$ | MAS, LMA | 0.44 |
| | 2 | 12.15 | 36.32 | 49.81 | 1.72 | 2.99 | $La_2O_3$ | MAS, LMA, AS | 0.65 |
| | 3 | 12.72 | 35.45 | 49.78 | 2.06 | 2.79 | $La(OH)_3$ | MAS, LMA | 0.21 |
| | 4 | 12.39 | 35.79 | 49.42 | 2.34 | 2.89 | $La(OH)_3$ | MAS, LMA, AS | 0.32 |
| | 5 | 12.83 | 35.10 | 49.25 | 2.82 | 2.74 | $La_2O_3$ | MAS, LMA, AS | 0.14 |
| | 6 | 12.60 | 35.44 | 49.32 | 2.63 | 2.81 | $LaAl_{11}O_{18}$ | MAS, LMA, AS | 0.19 |
| | 7 | 12.74 | 35.52 | 49.40 | 2.34 | 2.79 | $La_2O_3$ | MAS, LMA, AS | 0.22 |
| | 8 | 13.03 | 35.58 | 50.50 | 0.89 | 2.73 | $La_2O_3$ | MAS, LMA, AS | 0.01 |
| | 9 | 12.55 | 35.61 | 49.59 | 2.25 | 2.84 | $La_2O_3$ | MAS, LMA | 0.46 |
| | 10 | 12.39 | 36.41 | 49.63 | 1.57 | 2.94 | $La_2O_3$ | MAS, LMA, AS | 0.61 |
| | 11 | 12.72 | 36.10 | 48.84 | 2.25 | 2.84 | $LaAl_{11}O_{18}$ | MAS, LMA, AS | 0.45 |
| | 12 | 12.13 | 36.89 | 49.74 | 1.19 | 3.04 | $La_2O_3$ | MAS, LMA, AS | 0.71 |
| | 13 | 12.62 | 35.50 | 49.63 | 2.25 | 2.81 | $La_2O_3$ | MAS, LMA | 0.35 |
| Comparative | 14 | 12.85 | 32.55 | 51.72 | 2.87 | 2.53 | $La_2O_3$ | MAS | 0 |

TABLE 1-continued

| sample | | | | | | | | | |
|---|---|---|---|---|---|---|---|---|---|
| | 15 | 11.94 | 36.28 | 49.82 | 1.96 | 3.04 | La$_2$O$_3$ | MAS, AS | 0 |
| | 16 | 12.29 | 32.08 | 51.32 | 4.31 | 2.61 | La$_2$O$_3$ | MAS, L2S | 0 |
| | 17 | 13.16 | 35.33 | 48.55 | 2.96 | 2.69 | La$_2$O$_3$ | MAS, MA | 0 |

| | No. | X-ray Diffractometry Amount of Mullite $I_{AS}(110)/I_{MAS}(002)$ | Bulk Density g/cm$^3$ | Thermal Expansion Coefficient 22° C. 10$^{-6}$/K | Young's Modulus GPa | Fracture Toughness Value MPa·m$^{1/2}$ | Average Surface Roughness Ra (nm) |
|---|---|---|---|---|---|---|---|
| Inventive Sample | 1 | 0 | 2.58 | 0.015 | 144 | 1.7 | 0.37 |
| | 2 | 0.22 | 2.62 | 0.048 | 148 | 2.0 | 0.95 |
| | 3 | 0 | 2.57 | −0.004 | 143 | 1.5 | 0.27 |
| | 4 | 0.15 | 2.59 | 0.025 | 145 | 1.9 | 0.47 |
| | 5 | 0.06 | 2.57 | −0.002 | 143 | 1.4 | 0.38 |
| | 6 | 0.10 | 2.58 | 0.009 | 145 | 1.5 | 0.32 |
| | 7 | 0.05 | 2.58 | 0.019 | 144 | 1.5 | 0.31 |
| | 8 | 0.12 | 2.56 | 0.032 | 143 | 1.4 | 0.28 |
| | 9 | 0 | 2.58 | 0.031 | 147 | 1.7 | 0.46 |
| | 10 | 0.20 | 2.60 | 0.049 | 148 | 1.6 | 0.84 |
| | 11 | 0.07 | 2.58 | 0.038 | 145 | 1.5 | 0.65 |
| | 12 | 0.13 | 2.63 | 0.044 | 149 | 1.7 | 0.91 |
| | 13 | 0 | 2.58 | 0.012 | 146 | 1.4 | 0.35 |
| Comparative sample | 14 | 0 | 2.55 | 0.028 | 131 | 1.1 | 0.72 |
| | 15 | 0.02 | 2.61 | 0.049 | 132 | 1.0 | 0.89 |
| | 16 | 0 | 2.58 | 0.075 | 134 | 1.0 | 1.12 |
| | 17 | 0 | 2.59 | 0.124 | 144 | 1.2 | 2.54 |

*[1] denoted in terms of oxide (La$_2$O$_3$)
*[2] MAS = cordierite LMA = LaMgAl$_{11}$O$_{19}$ AS = mullite L2S = La$_2$O$_3$•2SiO$_2$ MA = spinel The Samples NO. 1 to NO. 13 in Table 1 are inventive samples which fall within the scope of the present invention. The cordierite-based sintered bodies of the inventive samples have an absolute value of a thermal expansion coefficient thereof of 0.049×10$^{-6}$/° C. or less as measured at 22° C., a Young's modulus (elastic modulus) of 142 GPa or more, and an average surface roughness (Ra) of the polishing surface of 0.95 nm or less. Thus, low thermal expansibility, high stiffness (high elastic modulus) and precision polishing characteristic of the cordierite-based sintered bodies of the inventive samples are equal to or more excellent than that of the cordierite-based sintered body described in the Patent Document 1. Moreover, the cordierite-based sintered bodies of the inventive samples have a fracture toughness value of 1.4 MPa·m$^{1/2}$ or more, which is higher than that of a comparative sample 14 having a single cordierite phase, and consequently, also have complex and fine processability.

The Sample NO. 14 in Table 1 having a single cordierite phase is a comparative sample without a LaMgAl$_{11}$O$_{19}$ crystal phase. This sample has a low fracture toughness value, and is insufficient in complex and fine processability and a Young's modulus (elastic modulus).

The Samples NOs. 15 to 17 in Table are also comparative samples without a LaMgAl$_{11}$O$_{19}$ crystal phase. These all have a low fracture toughness value, and are insufficient in complex and fine processability. As for each of the Sample NO. 16 having La$_2$O$_3$.2SiO$_2$ crystal phase and the Sample NO. 17 having spinel crystal phase, average surface roughness (Ra) of a precision polishing surface becomes larger, and consequently, precision polishing characteristic deteriorates and the thermal expansion coefficient becomes higher.

EXAMPLE 2

For specific evaluating of complex and fine processability, the Sample NO. 2 and the Sample NO. 7 as ones of the inventive samples, and the Sample NO. 16 as one of the comparative samples in Table 1 were subjected to groove grinding. In this groove grinding, ten grooves having a width of 0.5 mm and a depth of 1.5 mm s formed with clearances of 0.3 mm. As a result, nine narrow raised portions having a width of 0.3 mm and a height of 1.5 mm were formed. Complex and fine processability was evaluated by breakage state of this narrow raised portions. Here, a resin-bonded diamond wheel having a diameter of 300 mm and a width of 0.5 mm, and diamond abrasives of grit #200 was used as grinding wheel. As processing machine, an oil static precision surface grinder was used and a cutting amount was set to 3 μm/pass at a wheel speed of 2000 m/min.

As a result, in the Sample NO. 2 and the Sample NO. 7 as ones of the inventive samples, all raised portions processed satisfactorily, but in the Sample NO. 16 as one of the comparative samples, breakage occurred in 6 out of 9 raised portions.

EXAMPLE 3

A block gauge was prepared for each of the Sample NO. 2 and the Sample NO. 7 as ones of the inventive samples, and the Sample NO. 16 as one of the comparative samples in Table 1, and then a dimensional temporal change thereof was evaluated. Laser interferometry was used as an evaluating method, and the dimensional temporal change was evaluated as a change in length which has occurred with respect to 100 mm and per one year. The Sample NO. 2 and the Sample NO. 7 as ones of the inventive samples had significantly small changes of 8 nm and 4 nm, respectively. That is, dimensional temporal stability of a cordierite-based sintered body of the present invention is equal to or more excellent than that of the cordierite-based sintered body described in the Patent Document 1.

On the other hand, the Sample NO. 16 as one of the comparative samples had the change of 32 nm.

INDUSTRIAL APPLICABILITY

In addition to a satellite mirror, an aspherical mirror for a telescope, an ultra-precision mirror and a substrate for a power laser mirror, the cordierite-based sintered body of the present invention is usable as a supporting member, table and slider for precision stage, as well as a reference component associated with a precision measurement such as a scale board and gauges for an encoder, a standard scale for calibration, a reference scale, an optical flat, a photomask standard or the like.

The invention claimed is:

1. A cordierite-based sintered body comprising cordierite as a primary crystal phase and $LaMgAl_{11}O_{19}$ as a secondary crystal phase, wherein a ratio $I_{LMA}$ (114)/$I_{MAS}$ (004) is in the range of 0.01 to 0.8, where the $I_{LMA}$ (114) denotes a peak intensity of a (114) plane of $LaMgAl_{11}O_{19}$ as measured by powder X-ray diffractometry, and the $I_{MAS}$ (004) denotes a peak intensity of a (004) plane of the cordierite as measured by powder X-ray diffractometry.

2. The cordierite-based sintered body as recited in claim 1, wherein a mass ratio $Al_2O_3$/MgO of $Al_2O_3$ to MgO in the cordierite-based sintered body is 2.7 or more, and wherein the cordierite-based sintered body contains La in an amount of 0.5 mass % to less than 3 mass % in terms of oxide.

3. The cordierite-based sintered body as recited in claim 1, wherein an absolute value of a thermal expansion coefficient thereof is $0.05 \times 10^{-6}$/° C. or less, as measured at 22° C.

4. The cordierite-based sintered body as recited in claim 1, which has a Young's modulus of 142 GPa or more, and a fracture toughness value of 1.4 MPa·m$^{1/2}$ or more as measured by the SEPB method.

5. The cordierite-based sintered body as recited in claim 2, wherein an absolute value of a thermal expansion coefficient thereof is $0.05 \times 10^{-6}$/° C. or less, as measured at 22° C.

6. The cordierite-based sintered body as recited in claim 2, which has a Young's modulus of 142 GPa or more, and a fracture toughness value of 1.4 MPa·m$^{1/2}$ or more as measured by the SEPB method.

7. The cordierite-based sintered body as recited in claim 3, which has a Young's modulus of 142 GPa or more, and a fracture toughness value of 1.4 MPa·m$^{1/2}$ or more as measured by the SEPB method.

8. The cordierite-based sintered body as recited in claim 4, which has a Young's modulus of 142 GPa or more, and a fracture toughness value of 1.4 MPa·m$^{1/2}$ or more as measured by the SEPB method.

9. The cordierite-based sintered body as recited in claim 5, which has a Young's modulus of 142 GPa or more, and a fracture toughness value of 1.4 MPa·m$^{1/2}$ or more as measured by the SEPB method.

* * * * *